(12) United States Patent
Hotz (10) Patent No.: US 10,849,329 B2
(45) Date of Patent: Dec. 1, 2020

(54) HAMBURGER PRESS PATTY EXPRESS

(71) Applicant: Angela Marie Hotz, Lone Tree, IA (US)

(72) Inventor: Angela Marie Hotz, Lone Tree, IA (US)

(*) Notice: Subject to any disclaimer, the term of this patent is extended or adjusted under 35 U.S.C. 154(b) by 431 days.

(21) Appl. No.: 15/427,868

(22) Filed: Feb. 8, 2017

(65) Prior Publication Data

US 2017/0223972 A1   Aug. 10, 2017

Related U.S. Application Data

(60) Provisional application No. 62/292,575, filed on Feb. 8, 2016.

(51) Int. Cl.
*A22C 7/00* (2006.01)
*A47J 9/00* (2006.01)

(52) U.S. Cl.
CPC .......... *A22C 7/0076* (2013.01); *A22C 7/0046* (2013.01); *A47J 9/007* (2013.01)

(58) Field of Classification Search
CPC ............................ A22C 7/0076; A22C 7/0046
See application file for complete search history.

(56) References Cited

U.S. PATENT DOCUMENTS

| | | | | |
|---|---|---|---|---|
| 2,101,755 A * | 12/1937 | Rosenstone | .......... | A22C 7/0076 425/308 |
| 2,187,511 A * | 1/1940 | Baxter | .......... | A47J 43/20 425/572 |
| 2,500,973 A * | 3/1950 | Ackerman | .......... | B26D 1/25 425/308 |
| 3,609,799 A * | 10/1971 | Lee | .......... | A22C 7/0053 425/441 |
| 3,733,652 A * | 5/1973 | House | .......... | A22C 7/00 425/338 |
| 3,943,602 A * | 3/1976 | Siclari | .......... | A22C 7/0046 425/338 |
| 3,979,982 A * | 9/1976 | Cole | .......... | B26D 1/30 83/150 |
| 4,356,205 A * | 10/1982 | Richards | .......... | B26D 7/02 264/157 |
| 8,029,265 B2 * | 10/2011 | Hauser | .......... | A47J 43/20 425/193 |
| 8,622,727 B2 * | 1/2014 | Schill | .......... | B26D 7/02 425/193 |

* cited by examiner

*Primary Examiner* — Seyed Masoud Malekzadeh
(74) *Attorney, Agent, or Firm* — Simmons Perrine Moyer Bergman PLC (57) ABSTRACT

The purpose of this invention is to take a given food product such as loose hamburger meat and form it into multiple patty shapes with the use of a compacter within a container and a cutter. The patties should be formed without the user having any direct contact with raw meat.

8 Claims, 10 Drawing Sheets

HAMBURGER PRESS PATTY EXPRESS

TECHNICAL FIELD AND INDUSTRIAL APPLICABILITY OF THE INVENTION

This invention relates to the process of forming multiple hamburger patties at one time. A plunger is configured to compress the meat into the container. A cutter comprised of a set of cutting blades, slices into the meat which is formed into individual patties.

DESCRIPTION

Field of the Invention

This application relates to implements for use in food preparation, particularly including implements for forming food patties

Background of the Invention

The invention was designed to make multiple hamburger patties by compressing and cutting one pound of meat into several patties. The process should produce multiple hamburger patties without coming into direct contact with the raw meat.

SUMMARY OF THE INVENTION

The present invention is a slotted hinged container configured for receiving blades therein which form patties out of compressed ground meat therein.

The present invention is intended to cover a variation where the hamburger press can also make patties in specified sizes.

The present invention is intended to cover a variation where the hamburger patties can also be cooked in the container unit.

BRIEF DESCRIPTION OF DRAWINGS

Photos of a prototype of these are also shown.

Like numerals in the text, drawings, and photos refer to like matter throughout.

DETAILED DESCRIPTION OF THE PREFERRED EMBODIMENT

Figure 1:
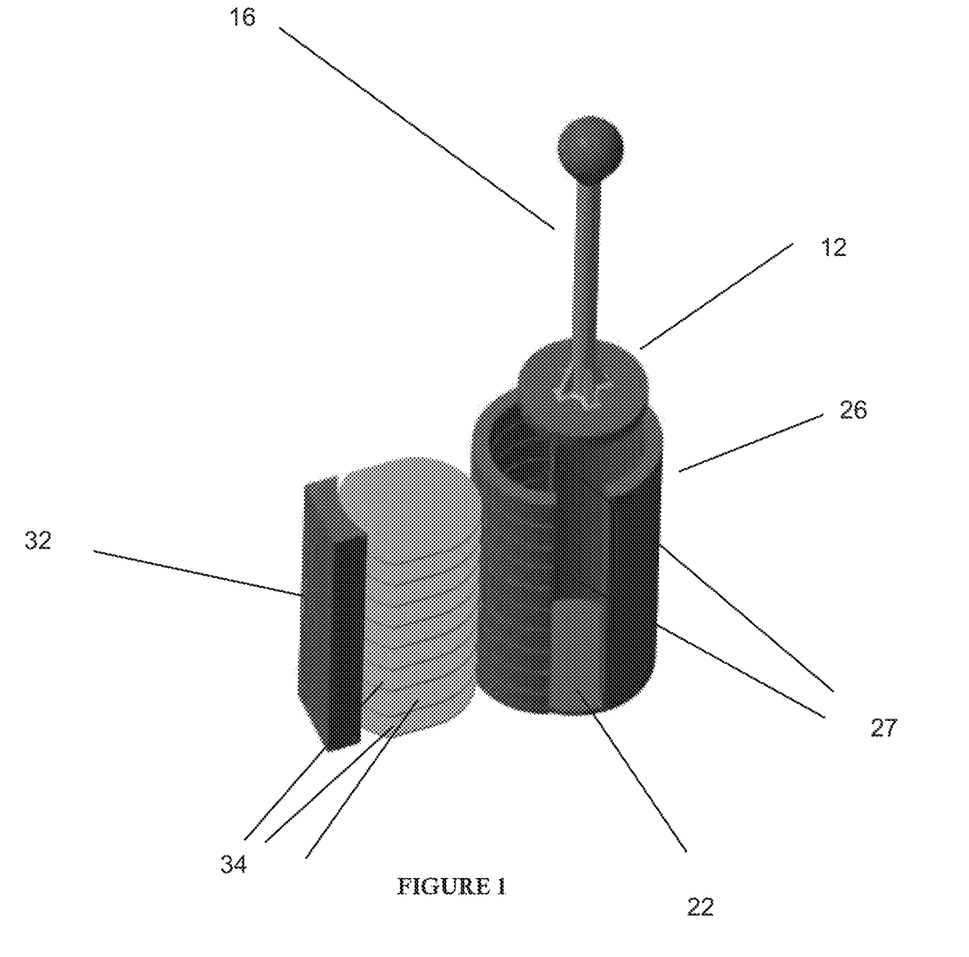
FIG. 1 is a side perspective view of a hamburger press of our new design.
Figure 2:
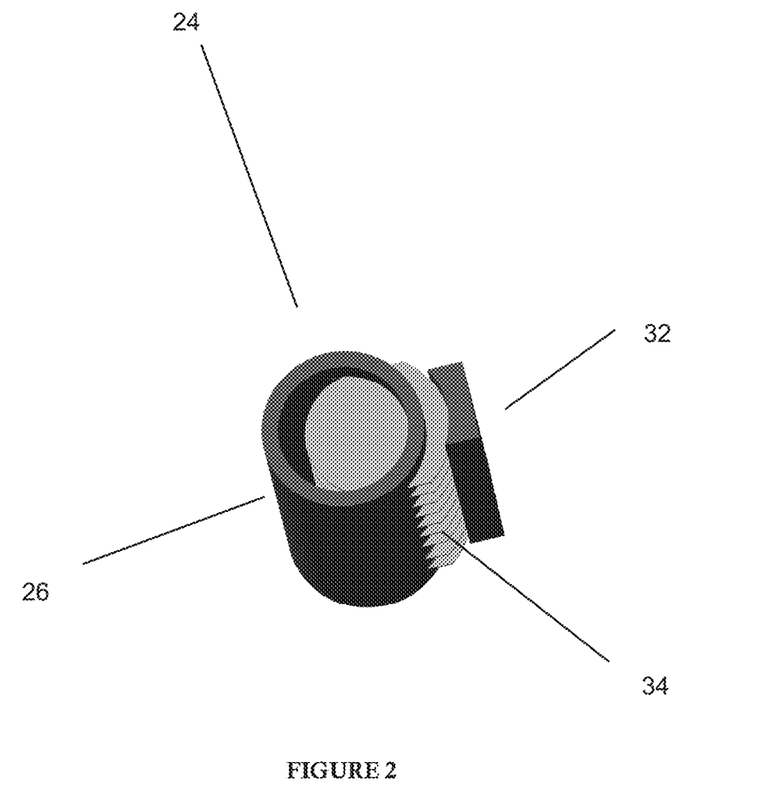
FIG. 2 is a top view of the cutter partially inside of the container.
Figure 3:
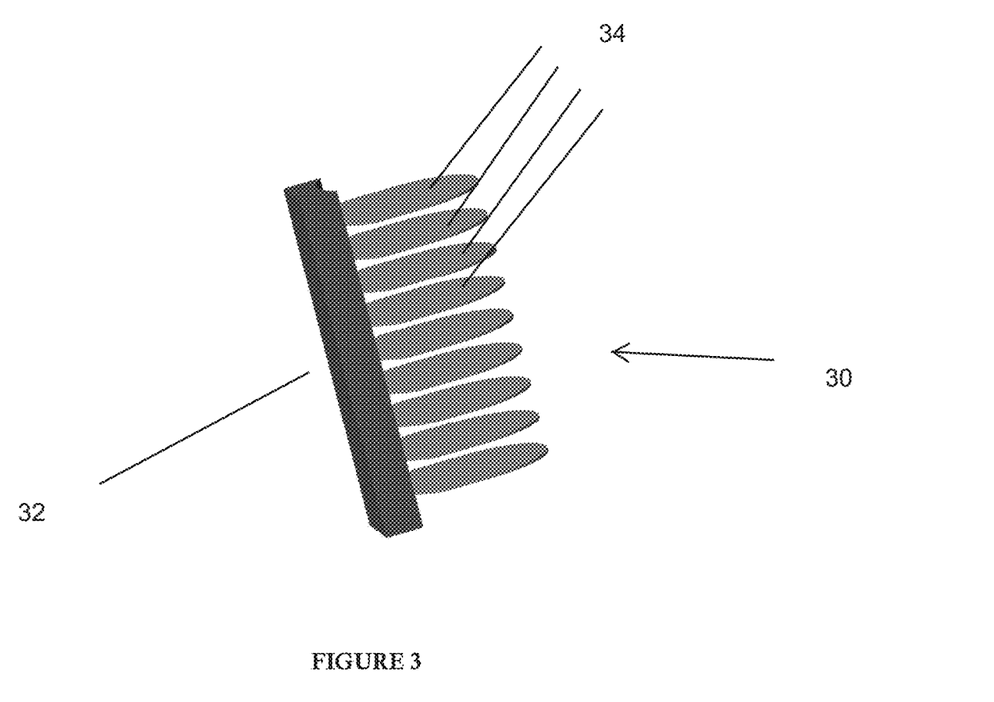
FIG. 3 is a side elevational view of the cutter.
Figure 4:
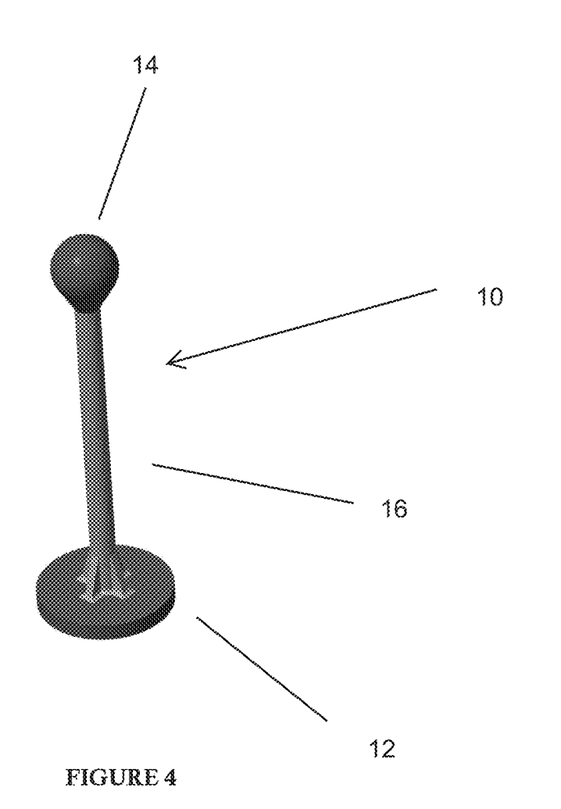
FIG. 4 is a side view of the plunger.
Figure 5:
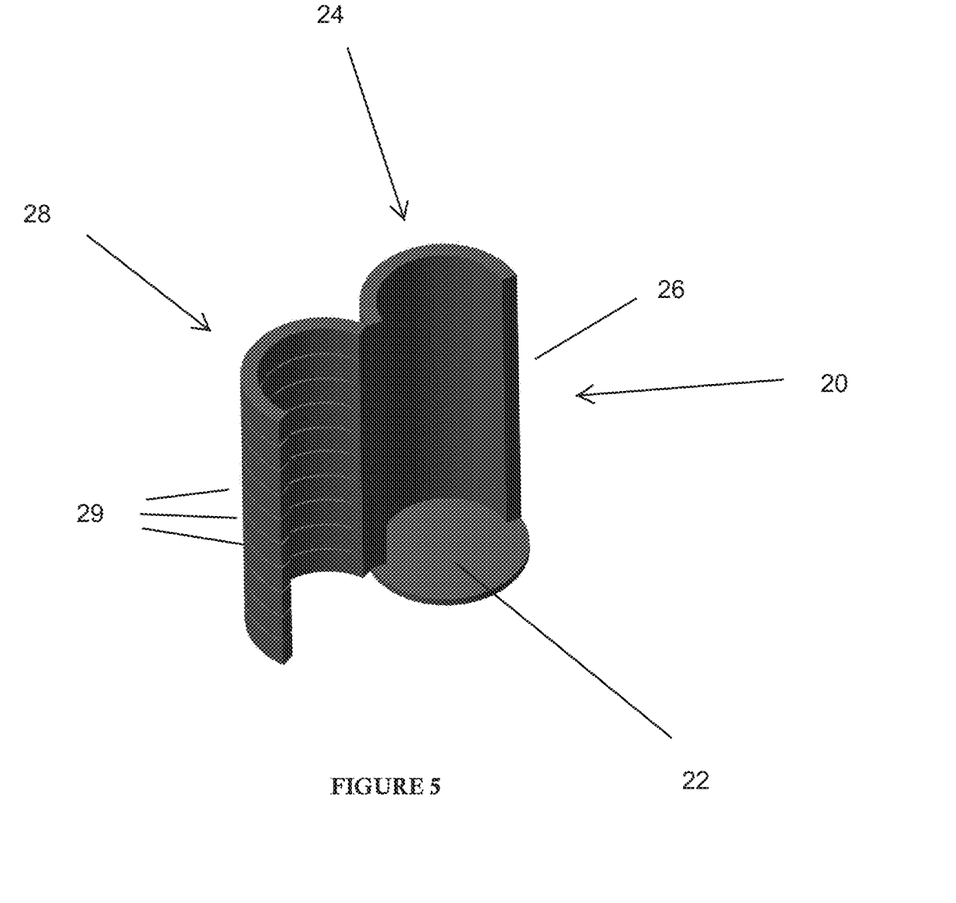
FIG. 5 is a side view of the open container that shows the side insert.
Figure 6:
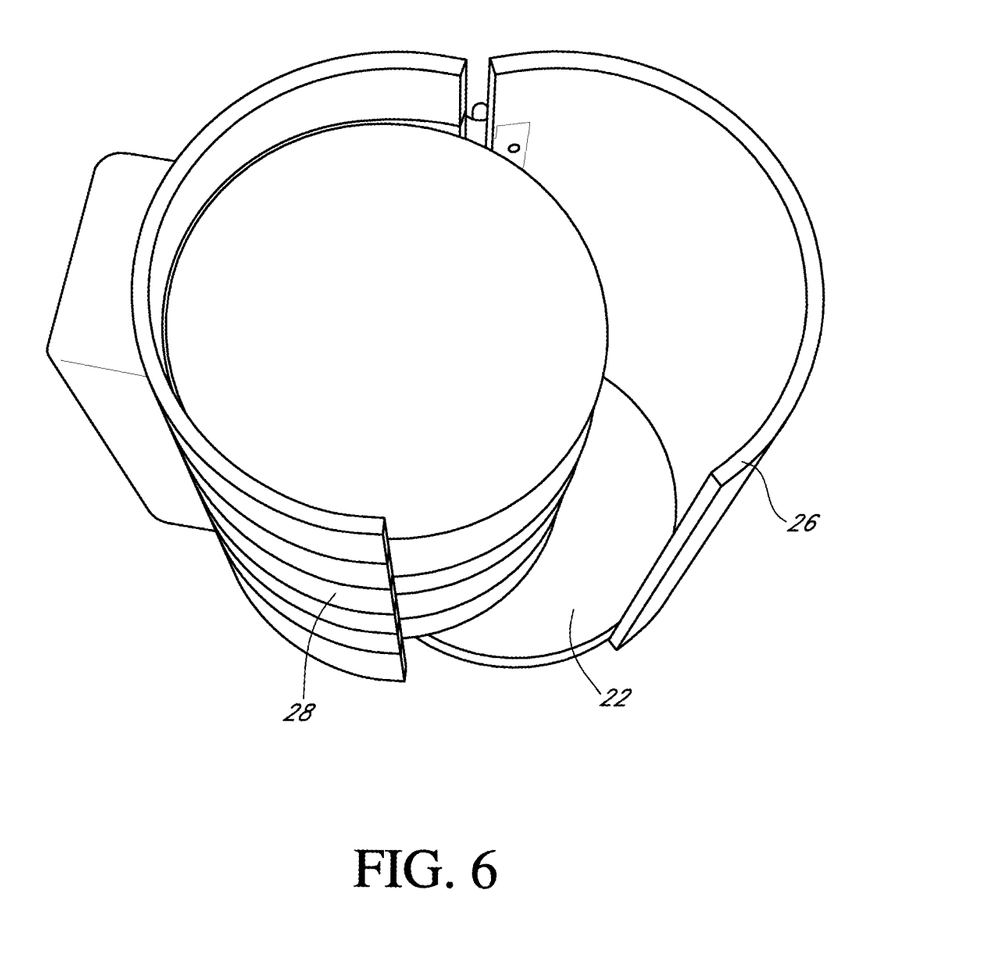
FIG. 6 is a top perspective view of the present invention with the apparatus in a partially opened configuration.
Figure 7:
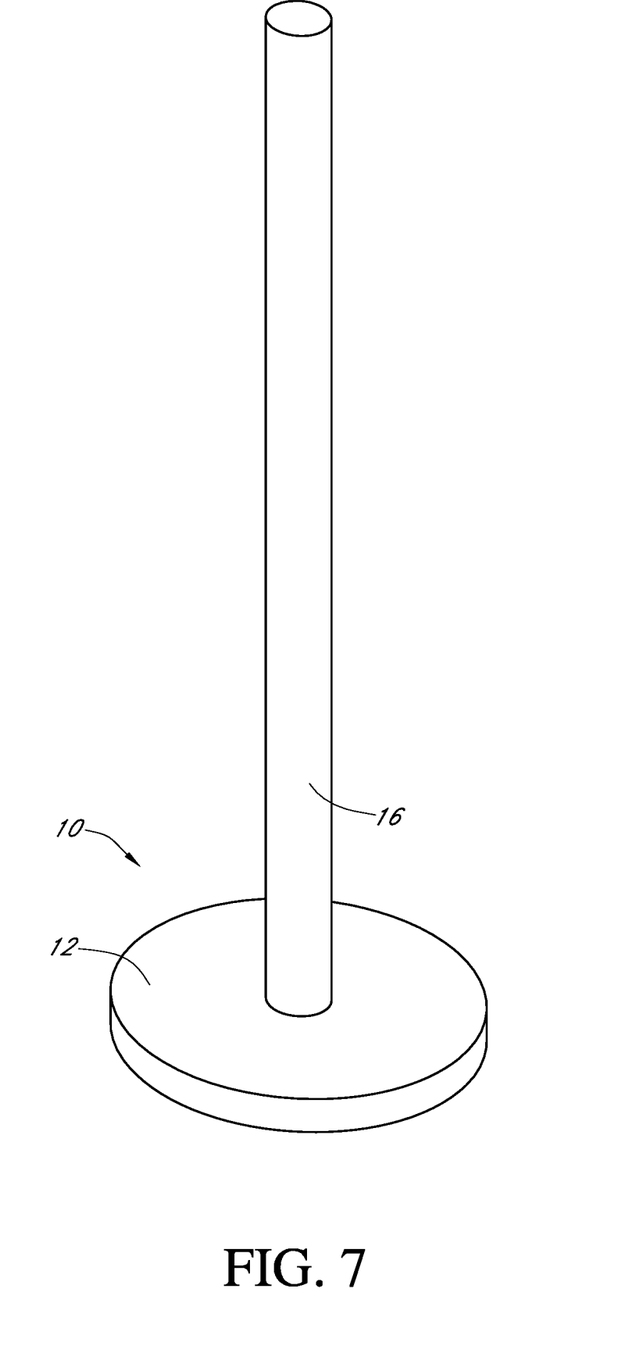
FIG. 7 is a side view of a portion of the present invention.
Figure 8:
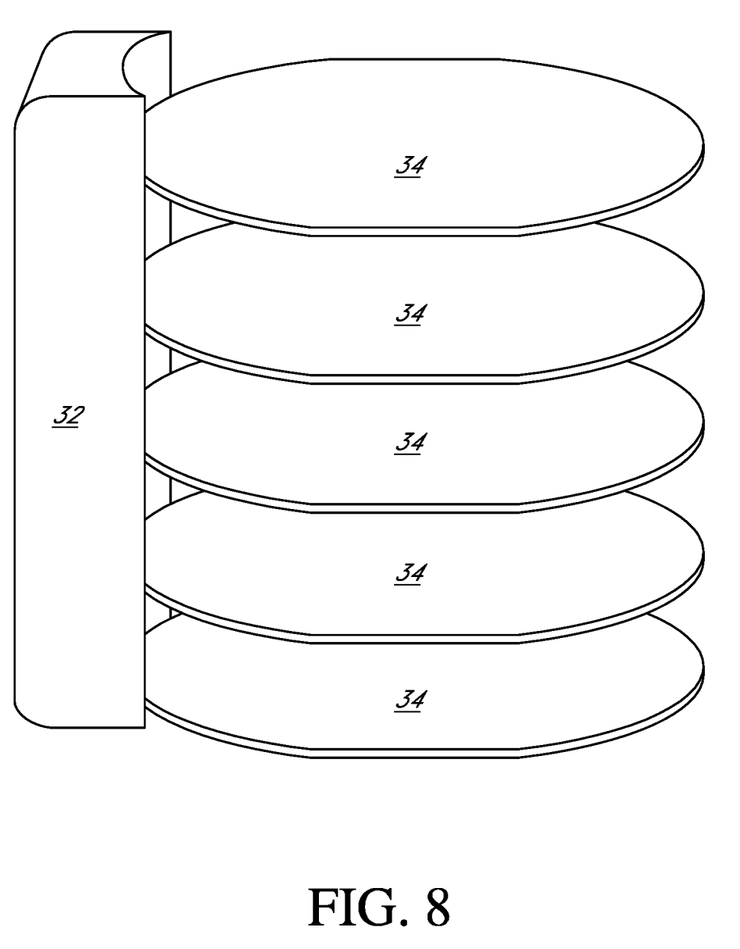
FIG. 8 is a side view of a portion of the apparatus of FIG. 6.
Figure 9:
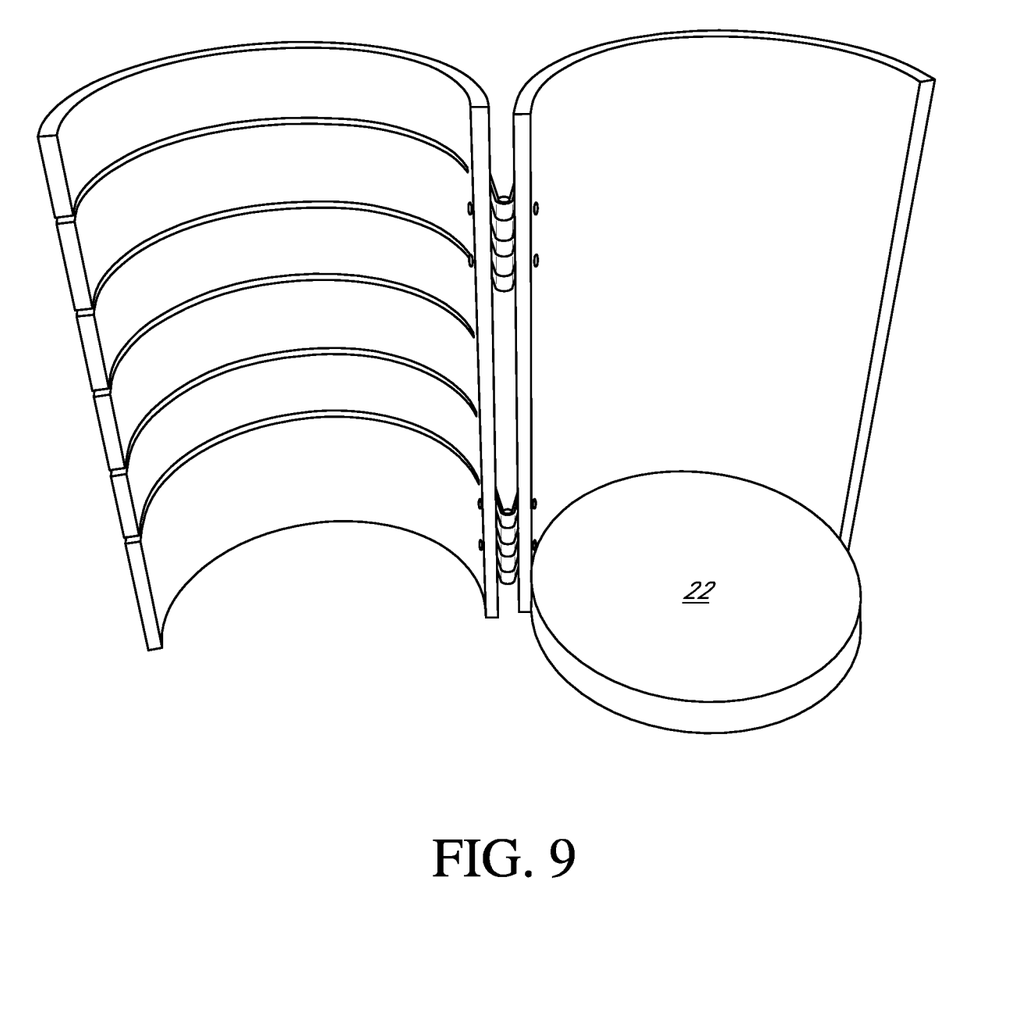
FIG. 9 is a side view of a portion of the FIG. 6 in a fully opened configuration.
Figure 10:
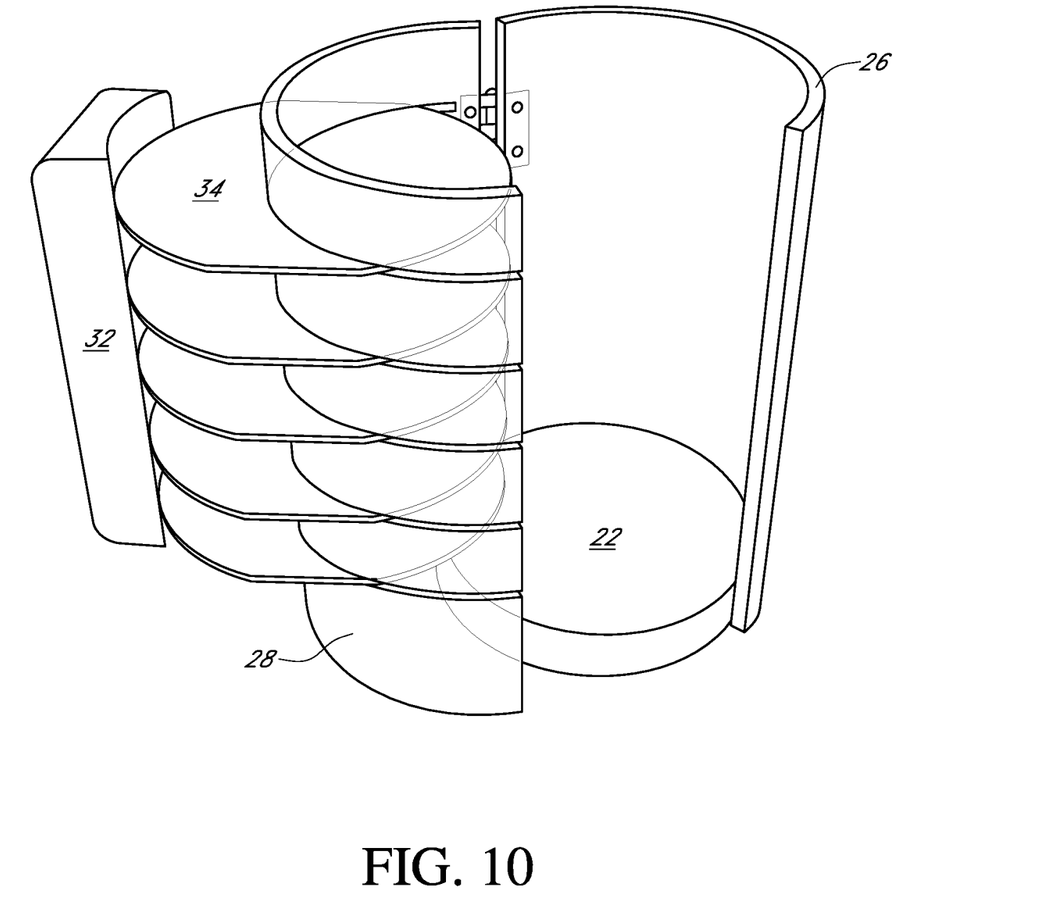
FIG. 10 is a side view of the apparatus of FIG. 8 partially inserted into the apparatus of FIG. 9 which is in a partially opened configuration.

The first part of the hamburger press is the plunger 10; which is the utensil used for compressing the meat to pack it in for compact meat patties. The second part is the cutter 30; which is the utensil used for slicing the meat into individual patties. A single movement of said cutter 30 will simultaneously cause each of a plurality of spaced apart and parallel cutting blades 34 to be introduced into the side 28 of said hinged container 20 through a different one of a plurality of parallel slots 29. The third part is to remove the patties; the individual cutting blades 34 are removed from the cutter base 32. Once the cutter base 32 is removed, the container can be opened allowing for the individual cutting blades 34 to be lifted out one by one with the patties attached.

I claim:

1. A hamburger making apparatus comprising:
    a hinged container, configured to retain therein ground meat;
    a plunger configured to pack meat in the container;
    said container comprising:
        a plurality of parallel slots therein;
        a cutter comprising:
            a cutter base;
            a plurality of spaced apart and parallel cutting blades coupled to said cutter base, configured in registration with said plurality of parallel slots, so that a single movement of said cutter base will simultaneously cause each of said plurality of spaced apart and parallel cutting blades to be introduced into said hinged container through a different one of said plurality of parallel slots;
            said cutter and said hinged container configured in combination so that when said blades are inserted in said slots of said container when said hinged container is filled with ground meat, a plurality of individual meat patties are formed; and
            wherein said hinged container is a cylinder divided in a first piece and second piece with hinges coupling one side of each vertical piece to the other.

2. The apparatus of claim 1 wherein said plurality of spaced apart and parallel cutting blades are each individually detachably coupled with said cutter base.

3. The apparatus of claim 1 wherein only one of said first piece and said second piece has said slots therein.

4. A hamburger making apparatus comprising:
    a container, configured to retain meat therein;
    a member configured to pack meat in the container;
    said container comprising:
        a plurality of orifices therein;
        a structure comprising:
            a base;
            a plurality of tools coupled to said base, configured in registration with said plurality of parallel orifices; and
            said structure and said container configured in combination so that a single movement of said base causing each of said plurality of tools to be simultaneously introduced into said container through a different one of said plurality of orifices when said container is filled with meat, a plurality of individual meat portions are formed.

5. The apparatus of claim 4 wherein said plurality of tools are each individually detachably coupled with said base.

6. The apparatus of claim 4 wherein said container is a cylinder divided in a first piece and second piece with hinges coupling one side of each piece to the other.

7. The apparatus of claim 4 wherein only one of said first piece and second piece has said orifices therein.

8. A hamburger making apparatus comprising:
a hinged container, configured to retain therein ground meat;
a plunger configured to pack meat in the container;
said container comprising:
- a plurality of parallel slots therein;
- a cutter comprising:
  - a cutter base;
  - a plurality of spaced apart and parallel cutting blades coupled to said cutter base, configured in registration with said plurality of parallel slots, so that a single movement of said cutter base will simultaneously cause each of said plurality of spaced apart and parallel cutting blades to be introduced into said hinged container through a different one of said plurality of parallel slots;
  - said cutter and said container configured in combination so that when said blades are inserted in said slots of said container when said container is filled with ground meat, a plurality of individual meat patties are formed;
  - wherein said plurality of spaced apart and parallel cutting blades are each individually detachably coupled with said cutter base;
  - wherein said hinged container is a cylinder divided in a first piece and second piece with hinges coupling one side of each vertical piece to the other; and
  - wherein only one of said first piece and said second piece has said slots therein.

\* \* \* \* \*